United States Patent
Wegner et al.

[11] Patent Number: 5,905,132
[45] Date of Patent: May 18, 1999

[54] AQUEOUS COATING MATERIALS AND THEIR USE FOR THE PRODUCTION OF FILLER COATS IN AUTOMOTIVE FINISHING

[75] Inventors: Egon Wegner, Münster; Lutz-Werner Gross, Haltern; Ralf Stein, Münster, all of Germany

[73] Assignee: BASF Coatings AG, Muenster-Hiltrup, Germany

[21] Appl. No.: 08/640,748

[22] PCT Filed: Oct. 20, 1994

[86] PCT No.: PCT/EP94/03446

§ 371 Date: May 6, 1996

§ 102(e) Date: May 6, 1996

[87] PCT Pub. No.: WO95/12626

PCT Pub. Date: May 11, 1995

[30] Foreign Application Priority Data

Nov. 6, 1993 [DE] Germany ............................. 43 37 961

[51] Int. Cl.$^6$ ..................................................... C08G 18/80
[52] U.S. Cl. .......................... 528/45; 528/71; 252/182.22; 524/839; 524/840; 524/591; 427/470
[58] Field of Search .................. 528/45, 71; 252/182.22; 524/839, 840, 591; 427/470

[56] References Cited

FOREIGN PATENT DOCUMENTS 0 548 873 A2  12/1992  European Pat. Off. ........ C08G 18/08
0 566 953 A1   4/1993  European Pat. Off. ........ C08G 18/08

Primary Examiner—Rachel Gorr

[57] ABSTRACT

The invention relates to coating materials containing a water-dilutable polyurethane resin as binder. The resin can be prepared by reacting some of the free isocyanate groups present in a prepolymer (I) which contains acidic groups and isocyanate groups with a blocking agent so as to form a prepolymer (II) which contains blocked isocyanate groups, the blocking agent being employed in a quantity such that the prepolymer (II) still contains on average at least one free isocyanate group per molecule, reacting the prepolymer (II) with a compound which contains at least one primary or secondary amino group and at least one hydroxyl group in the molecule, to give a polyurethane resin, and finally converting the polyurethane resin prepared in this way into a water-dilutable polyurethane resin by at least partial neutralization of the acidic groups.

15 Claims, No Drawings

AQUEOUS COATING MATERIALS AND THEIR USE FOR THE PRODUCTION OF FILLER COATS IN AUTOMOTIVE FINISHING

The invention relates to aqueous coating materials and to their use for the production of filler coats in automotive finishing.

Car bodies are coated by applying over one another an electrodeposition coat, a filler coat and one or two topcoats and baking them in succession in two or more baking steps. Generally in a first step the electrodeposition coat is deposited and baked. Then the baked electrodeposition coat is coated over with a filler coat. This filler coat is baked and coated over with a one- or two-coat topcoat. Finally the topcoat is baked. Two-coat topcoats consist of a pigmented basecoat and a clearcoat applied over it. Two-coat topcoats are usually applied by the wet-on-wet method, i.e. a pigmented basecoat is first produced which in the unbaked state is coated over with the clearcoat. Subsequently the pigmented basecoat and the clearcoat are baked together. However, it is also possible, for example, to apply a filler coat over the deposited electrodeposition coat in the unbaked state and then to bake electrodeposition coat and filler coat together. It is then possible to apply a one- or two-coat topcoat to the baked filler coat and to bake it.

It is also possible to apply the filler coat to an unbaked or to a baked electrodeposition coat and to apply to the unbaked filler coat the pigmented basecoat, for a two-coat topcoat, and then to bake the filler coat and the pigmented basecoat and, if appropriate, the electrodeposition coat together. A clearcoat can then be applied to the baked, pigmented basecoat and baked.

In automotive finishing the function of the filler coat is, in particular, to fill and to cover uneven areas in the electrodeposition coat in order to make the substrate level for the subsequent topcoat.

The better this filling and covering of uneven areas in the electrodeposition coat, the better the optical quality of the overall finish. In addition to the optical quality, there are also important mechano-technological properties of the overall finish, for example protection against corrosion and especially resistance to stone chipping and to other mechanical attacks, for which the quality of the filler coat is crucial. A further important requirement of the filler coat comes from the fact that the windows in a car body are fixed by adhesive bonding into the window-frames of the body, often using the filler coat as substrate. It is then of great importance for the durability of the pane bond that the adhesive employed adheres to the filler coat so well that it is not detached from the filler coat even under extreme weather conditions.

DE-A-40 05 961 discloses aqueous coating materials which contain a water-dilutable polyurethane resin as binder and which are suitable for the production of filler coats. The filler coats produced using these coating materials, with regard to their suitability as a substrate for the adhesive bonding of window panes in car bodies, are in need of improvement.

The object of the present invention is to provide aqueous coating materials which are suitable for the production of filler coats in automotive finishing and which are distinguished in particular by the fact that they give filler coats which are so highly suitable as a substrate for the adhesive bonding of window panes in car bodies that the adhesive bond of the window panes is not weakened even under severe stress, for example sharp fluctuations in humidity and temperature.

This object is surprisingly achieved by the provision of aqueous coating materials which contain at least one water-dilutable polyurethane resin as binder and which are characterized in that the water-dilutable polyurethane resin can be prepared by reacting, in a first step, (a) a polyisocyanate or a mixture of polyisocyanates and (b) a compound whose molecule contains at least one group which is reactive toward isocyanate groups and at least one acidic group which is capable of forming anions, or a mixture of such compounds, and (c) if desired, a polyester- and/or polyether-polyol having a number-average molecular weight of from 400 to 5000, or a mixture of such polyester- and/or polyether-polyols, and (d) if desired, a polyol having a number-average molecular weight of from 60 to 399, or a mixture of such polyols, to give an isocyanato-containing prepolymer (I), components (a), (b), (c) and (d) being reacted with one another in a proportion such that the isocyanate groups and the groups which are reactive toward isocyanate groups are present in a ratio of equivalents of from 1.04:1.00 to 10.00:1.00 and the polyurethane resin prepared from (a), (b), (c), (d), (e), (f) and (g) has an acid number of from 18 to 70; in a second step, some of the free isocyanate groups present in the prepolymer (I) are reacted with (e) a blocking agent or a mixture of blocking agents so as to form a prepolymer (II) containing blocked isocyanate groups, component (e) being employed in a quantity such that the prepolymer (II) still contains on average at least one free isocyanate group per molecule, the prepolymer (II), if desired, is mixed with (f) 2.0–400% by weight, based on the quantity of prepolymer (II), of a partially blocked polyisocyanate prepared from a polyisocyanate which contains on average more than 2.0 isocyanate groups per molecule and is free from acidic groups capable of forming anions, or from a mixture of such polyisocyanates and component (e), the prepolymer (II) or the mixture of prepolymer (II) and component (f) is reacted with (g) a compound containing at least one primary or secondary amino group and at least one hydroxyl group in the molecule, or a mixture of such compounds, to give a polyurethane resin, component (g) being employed in a quantity such that the free isocyanate groups of the prepolymer (II) or the free isocyanate groups of the mixture of prepolymer (II) and component (f), the amino groups of component (g) and the hydroxyl groups of component (g) are in a ratio of equivalents of from 1.00:0.15 to 5.00:0.15 to 5.00; and finally the polyurethane resin prepared in this way is converted into a water-dilutable polyurethane resin by at least partial neutralization of the acidic groups capable of forming anions.

The aqueous coating materials provided in accordance with the invention can be employed to produce the filler coat in any process for the finishing of car bodies, in which an electrodeposition coat, a filler coat and one or two topcoats are applied over one another and are baked in succession in two or more baking steps. The filler coats produced using the aqueous coating materials according to the invention are distinguished not only by the fact that they give very good coverage of the uneven areas of the substrate and have good mechano-technological properties but also by their good properties as substrates for the adhesive bonding of window panes in car bodies.

To prepare the polyurethane resins present in the coating materials according to the invention, in a first step (a) a polyisocyanate or a mixture of polyisocyanates and (b) a compound whose molecule contains at least one group which is reactive toward isocyanate groups and at least one acidic group which is capable of forming anions, or a mixture of such compounds, and (c) if desired, a polyester- and/or polyether-polyol having a number-average molecular weight of from 400 to 5000, or a mixture of such polyester- and/or polyether-polyols, and (d) if desired, a polyol having a number-average molecular weight of from 60 to 399, or a mixture of such polyols, are reacted to give an isocyanato-containing prepolymer (I), components (a), (b), (c) and (d) being reacted with one another in a ratio such that the isocyanate groups and the groups which are reactive toward isocyanate groups are present in a ratio of equivalents of from 1.04:1.00 to 10.00:1.00 and the polyurethane resin prepared from (a), (b), (c), (d), (e), (f) and (g) (components (e), (f) and (g) are described below) has an acid number of from 18 to 70.

The reaction of components (a), (b), (c) and (d) is carried out by well-known methods of polyurethane chemistry in bulk or in an organic solvent, preferably in the presence of catalysts such as dibutyltin dilaurate, dibutyltin maleate, tertiary amines, etc.

As component (a) it is possible to employ aliphatic and/or cycloaliphatic and/or aromatic and/or araliphatic polyisocyanates. Examples of aromatic and araliphatic polyisocyanates are phenylene diisocyanate, tolylene diisocyanate, xylylene diisocyanate, biphenylene diisocyanate, naphthylene diisocyanate, diphenylmethane diisocyanate and tetramethylxylene diisocyanate (TMXDI). Because of their good resistance to ultraviolet light (cyclo)aliphatic polyisocyanates give products with a low tendency to yellowing. Examples of cycloaliphatic polyisocyanates are isophorone diisocyanate, cyclopentylene diisocyanate and the hydrogenation products of the aromatic diisocyanates, such as cyclohexylene diisocyanate, methylcyclohexylene diisocyanate and dicyclohexylmethane diisocyanate. Aliphatic diisocyanates are compounds of the formula

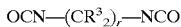

OCN—(CR³₂)ᵣ—NCO in which r is an integer from 2 to 20, in particular from 6 to 8, and $R^3$ which may be identical or different is hydrogen or a lower alkyl radical having 1 to 8 carbon atoms, preferably 1 or 2 carbon atoms. Examples of these are trimethylene diisocyanate, tetramethylene diisocyanate, pentamethylene diisocyanate, hexamethylene diisocyanate, propylene diisocyanate, ethylethylene diisocyanate, dimethylethyl diisocyanate, methyltrimethylene diisocyanate and trimethylhexane diisocyanate. Isophorone diisocyanate and dicyclohexylmethane diisocyanate are preferably employed.

With respect to the functionality of the polyisocyanates component (a) must have a composition such that a crosslinked polyurethane resin is not obtained. In addition to diisocyanates component (a) may also contain a proportion of polyisocyanates having functionalities of more than two—for example triisocyanates. A reduction in the average functionality of component (a) can be achieved by adding monoisocyanates such as phenyl isocyanate, cyclohexyl isocyanate and stearyl isocyanate. Triisocyanates which have been found suitable are products formed by trimerization or oligomerization of diisocyanates or by reaction of diisocyanates with compounds containing two or more OH or NH groups. These include, for example, the biuret of hexamethylene diisocyanate and water, the isocyanurate of hexamethylene diisocyanate, or the adduct of isophorone diisocyanate with trimethylolpropane.

As component (b) it is preferred to employ compounds which contain in the molecule two groups which are reactive toward isocyanate groups and one acidic group which is capable of forming anions. Suitable groups which are reactive toward isocyanate groups are, in particular, hydroxyl groups and primary and/or secondary amino groups. Suitable groups which are capable of forming anions are carboxyl, sulfonic acid and/or phosphonic acid groups, with carboxyl groups being preferred. As component (b) it is possible, for example, to employ alkanoic acids having two substituents on the α-carbon atom. The substituent may be a hydroxyl group, an alkyl group or preferably an alkylol group. These alkanoic acids have at least one, generally from 1 to 3, carboxyl groups in the molecule. They have from two to about 25, preferably from 3 to 10, carbon atoms. Examples of component (b) are dihydroxypropionic acid, dihydroxysuccinic acid and dihydroxybenzoic acid. A particularly preferred group of alkanoic acids are the α,α-dimethylolalkanoic acids of the general formula $R^4$—C(CH$_2$OH)$_2$COOH, in which $R^4$ is a hydrogen atom or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are 2,5-diaminovaleric acid, 3,4-diaminobenzoic acid, 2,4-diaminotoluenesulfonic acid and 2,4-diaminodiphenyl-ether-sulfonic acid.

As component (c) it is possible to employ saturated and unsaturated polyester- and/or polyether-polyols, especially polyester- and/or polyether-diols having a number-average molecular weight of from 400 to 5000. Examples of suitable polyether-diols are polyether-diols of the general formula H(—O—(CHR¹)$_n$—)$_m$OH, in which $R^1$ is hydrogen or a lower, unsubstituted or substituted alkyl radical, n is 2 to 6, preferably 3 to 4 and m is 2 to 100, preferably 5 to 50. Examples which can be mentioned are linear or branched polyether-diols such as poly(oxyethylene) glycols, poly(oxypropylene) glycols and poly(oxybutylene) glycols. The polyether-diols selected should not introduce excessive proportions of ether groups, since otherwise the polymers formed swell in water. The preferred polyether-diols are poly(oxypropylene) glycols in the number-average molar mass range $M_n$ of from 400 to 3000.

Polyester-diols are prepared by esterifying organic dicarboxylic acids or their anhydrides with organic diols or are derived from a hydroxycarboxylic acid or from a lactone. In order to prepare branched polyester-polyols it is possible to employ to a minor extent polyols or polycarboxylic acids having a higher functionality. The dicarboxylic acids and diols may be linear or branched aliphatic, cycloaliphatic or aromatic dicarboxylic acids or diols.

The diols used to prepare the polyesters consist, for example, of alkylene glycols such as ethylene glycol, propylene glycol, butylene glycol, 1,4-butanediol, 1,6-hexanediol, neopentylglycol and other diols such as dimethylolcyclohexane. However, it is also possible to add small quantities of polyols such as trimethylolpropane, glycerol and pentaerythritol. The acid component of the polyester primarily comprises low molecular weight dicarboxylic acids or their anhydrides having from 2 to 44, preferably from 4 to 36, carbon atoms in the molecule. Examples of suitable acids are o-phthalic acid, isophthalic acid, terephthalic acid, tetrahydrophthalic acid, cyclohexanedicarboxylic acid, succinic acid, isododecylsuccinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided they exist. During the formation of polyester-polyols it is also possible for relatively small quantities of carboxylic acids having 3 or more carboxyl groups to be present, for example trimellitic anhydride or adducts of maleic anhydride with unsaturated fatty acids.

It is possible to employ polyester-diols which are obtained by reaction of a lactone with a diol. They are distinguished by the presence of terminal hydroxyl groups and repeating polyester units of the formula $(-CO-(CHR^2)_n-CH_2-O)$. In this formula n is preferably from 4 to 6 and the substituent $R^2$ is hydrogen or an alkyl, cycloalkyl or alkoxy radical. No substituent contains more than 12 carbon atoms. The total number of carbon atoms in the substituent does not exceed 12 per lactone ring. Examples of these compounds are hydroxycaproic acid, hydroxybutyric acid, hydroxydecanoic acid and/or hydroxystearic acid.

For the preparation of the polyester-diols the unsubstituted ε-caprolactone, in which n has the value 4 and all substituents $R^2$ are hydrogen, is preferred. The reaction with lactone is initiated by low molecular weight polyols such as ethylene glycol, 1,3-propanediol, 1,4-butanediol and dimethylolcyclohexane. However, it is also possible to react other reaction components, such as ethylenediamine, alkyldialkanolamines or alternatively urea, with caprolactone.

As component (d) it is possible to employ, for example, polyols such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof. The polyols are generally employed in quantities of from 0 to 30 percent by weight, preferably from 0 to 20 percent by weight, based on the quantity of component (c) and (d) employed.

In a second step, some of the free isocyanate groups present in the prepolymer (I) are reacted with (e) a blocking agent or a mixture of blocking agents so as to form a prepolymer (II) which contains blocked isocyanate groups, component (e) being employed in a quantity such that the prepolymer (II) still contains on average at least one free isocyanate group per molecule.

The reaction of the prepolymer (I) with component (e) is carried out by the well-known methods of polyurethane chemistry, preferably in an organic solvent.

As component (e) it is possible in principle to employ all blocking agents which are suitable for polyisocyanates. Examples are aliphatic monoethers of alkanediols, such as ethylglycol, propylglycol and butylglycol; aliphatic monoalcohols having 1 to 4 carbon atoms in the molecule such as methanol, ethanol, propanol and butanol, cycloaliphatic monoalcohols such as cyclohexanol; aromatic alkyl alcohols such as phenylcarbinol; phenol compounds, such as phenol itself and substituted phenols such as cresol, nitrophenol, chlorophenol and ethylphenol; amines such as di-n-butylamine, di-sec-butylamine, dicyclohexylamine, piperidine, 2-methylpiperidine and 2,6-dimethylpiperidine; oximes such as acetone oxime, butanone oxime, diethyl ketoxime, methyl isobutyl ketoxime, diisopropyl ketoxime, cyclohexanone oxime, 2-methylcyclohexanone oxime, 2,6-dimethylcyclohexanone oxime and acetophenone oxime; lactams such as ε-caprolactam, and CH-acidic compounds such as dialkyl malonates, alkyl acetoacetates and acetylacetone; and heterocyclic compounds such as furfuryl alcohol, etc.

As component (e) it is preferred to employ oximes such as acetone oxime, butanone oxime, diethyl ketoxime, methyl isobutyl ketoxime, diisopropyl ketoxime, cyclohexanone oxime, 2-methylcyclohexanone oxime, 2,6-dimethylcyclohexanone oxime and acetophenone oxime, particularly preferably butanone oxime.

Before the prepolymer (II) is reacted further with component (g) it can be mixed, if desired, with (f) 2.0–400% by weight, based on the quantity of prepolymer (II), of a partially blocked polyisocyanate prepared from a polyisocyanate which contains on average more than 2.0 isocyanate groups per molecule and which is free from acidic groups capable of forming anions, or from a mixture of such polyisocyanates and component (e).

The preparation of partially blocked polyisocyanates is well known to the person skilled in the art. As component (f) it is preferred to employ a partially blocked polyisocyanate which still contains on average at least one free isocyanate group per molecule. The mixture of prepolymer (II) and component (f) can be prepared by preparing component (f) separately and mixing it with the prepolymer (II). It is preferably prepared by mixing the prepolymer (II) with an appropriate amount of a polyisocyanate which contains on average more than 2.0 isocyanate groups per molecule and is free from acidic groups capable of forming anions, or a mixture of such polyisocyanates, and then reacting some of the isocyanate groups of the polyisocyanate or mixture of polyisocyanates added with the blocking agent (e) in the presence of the prepolymer (II). In order to prepare the mixture of prepolymer (II) and component (f) the polyisocyanate or mixture of polyisocyanates can also be added to the prepolymer (II) or to the reaction mixture of prepolymer (I) and component (e) even before and/or during the reaction of the prepolymer (I) with component (e). This procedure, however, is less preferred, especially when the reactivity of the isocyanate groups in the prepolymer (I) and in the polyisocyanate or mixture of polyisocyanates toward component (e) is very different.

Polyisocyanates which contain on average more than 2.0 isocyanate groups per molecule and which are free from acidic groups capable of forming anions are known.

Examples of such polyisocyanates are compounds obtained by trimerization or oligomerization of diisocyanates or by reaction of diisocyanates with polyfunctional polyols or polyamines. Examples of these include the biuret of hexamethylene diisocyanate and water, the isocyanurate of hexamethylene diisocyanate or the adduct of isophorone diisocyanate with trimethylolpropane.

In a further reaction step the prepolymer (II) or the mixture of prepolymer (II) and component (f) is reacted with (g) a compound which contains at least one primary or secondary amino group and at least one hydroxyl group in the molecule, or a mixture of such compounds, to give a polyurethane resin, component (g) being employed in a quantity such that the free isocyanate groups of the prepolymer (II) or the free isocyanate groups of the mixture of prepolymer (II) and component (f), the amino groups of component (g) and the hydroxyl groups of component (g) are in a ratio of equivalents of from 1.00:0.15 to 5.00:0.15 to 5.00, preferably from 1.00:0.25 to 3.00:0.25 to 3.00 and particularly preferably from 1.00:0.33 to 2.00:0.33 to 2.00. Subsequently the polyurethane resin prepared in this way is converted into a water-dilutable polyurethane resin by at least partial neutralization of the acidic groups capable of forming anions.

The reaction with component (g) is carried out by generally well-known methods of polyurethane chemistry, preferably in an organic solvent.

As component (g) it is possible in principle to employ any compound which contains at least one primary or secondary amino group and at least one hydroxyl group in the molecule, or a mixture of such compounds. Examples of such compounds are:

ethanolamine, propanediol amine, N-methylethanolamine, N-ethylethanolamine, N-methylpropanolamine, N-ethylpropanolamine, diethanolamine, dipropanolamine and N-hydroxyethylaminobenzene, and also N-hydroxyethylethylenediamine, N-hydroxyethylpropylenediamine, N-hydroxypropylethylenediamine, N-hydroxypropylpropylenediamine, N,N'-dihydroxyethylethylenediamine, N,N'-dihydroxyethylpropylenediamine, N,N'-dihydroxypropylethylenediamine, N,N'-dihydroxypropylpropylenediamine and ethoxylated N,N'-bis-(3-aminopropyl)ethylenediamine and ethoxylated 4-amino-methyl-1,8-octanediamine.

In order to convert the polyurethane resin prepared in the manner described above into a water-dilutable form, at least some of the acidic groups capable of forming anions, which are present in the polyurethane resin, are neutralized. Volatile amines are preferably employed for the neutralization. In this context the tertiary amines are preferred, while ammonia and primary and secondary amines are less preferred. Examples of suitable amines are trimethylamine, triethylamine, triisopropylamine, tributylamine, N-methylmorpholine, N-methylpiperazine, N,N-dimethylethanolamine, N,N-diethylethanolamine, triethanolamine, N-methyldiethanolamine, dimethylaminopropanol and N-hydroxyethylpiperazine.

Using the water-dilutable polyurethane resins prepared in the manner described above and with the aid of their expert knowledge, the person skilled in the art is able to formulate aqueous coating materials which are suitable for the production of filler coats in automotive finishing and which have the above-described advantages. In this context they can combine the water-dilutable polyurethane resins, to be employed in accordance with the invention, with other water-dilutable binders, for example polyester resins and/or amino resins and/or epoxy resins and/or polyacrylate resins, etc. Examples of binders for combination (the term binders referring both to "principal binders" and to "crosslinking binders") are disclosed in, for example, the following patent documents: DE-A-40 05 961, EP-A-330 139, EP-A-339 433 and DE-A-33 18 595. It is preferred for the aqueous coating materials according to the invention to contain, in addition to the water-dilutable polyurethane resin employed in accordance with the invention, a further water-dilutable polyester resin and, if desired, an amino resin as well.

In this context it is particularly preferred to employ the water-dilutable polyurethane resin according to the invention in a quantity of from 30 to 70% by weight, preferably from 30 to 60% by weight, the water-dilutable polyester resin in a quantity of from 15 to 60% by weight, preferably from 30 to 60% by weight, and the amino resin in a quantity of from 5 to 35% by weight, preferably from 5 to 25% by weight, the percentages by weight being based on the overall quantity of water-dilutable polyurethane resin, water-dilutable polyester resin and amino resin=100% by weight. Amino resins employed are melamine and/or benzoguanamine resins. Such resins are conventional for the production of coating materials, and a wide selection is available on the market. The aqueous coating materials according to the invention may also contain, in addition to the binders described above, customary pigments, fillers, plasticizers, stabilizers, wetting agents, dispersion auxiliaries, leveling assistants, antifoams, catalysts, etc.

The coating materials according to the invention can be applied by methods known per se, for example by spraying, brushing, dipping, flow coating, knife coating or rolling, to any desired substrates, for example metals, plastics, wood or glass. They are preferably employed in automotive finishing by spraying to produce filler coats.

The invention is illustrated in more detail in the examples which follow. All parts and percentages are by weight unless expressly stated otherwise.

1. Preparation of Water-Dilutable Polyurethane Resins Employed in Accordance with the Invention 1.1 Polyurethane resin I 383.6 g of a 73% strength solution of a polyester-polyol (acid number: from 3.5 to 4.0, prepared from 39.5 parts by weight of dimerized fatty acid (Pripol® 1013, manufacturer: Unichema) 21.7 parts by weight of 1,6-hexanediol and 11.7 parts by weight of isophthalic acid) in methyl ethyl ketone, 26.8 g of dimethylolpropionic acid, 157.2 g of dicyclohexylmethane diisocyanate (Desmodur® W, manufacturer: Bayer AG) and 95.3 g of methyl ethyl ketone are weighed under nitrogen into a dry reaction vessel having a thermometer and reflux condenser and are heated to 78° C. This temperature is maintained until an NCO content of from 2.5 to 2.6% is reached. Then 17.4 g of butanone oxime are added dropwise and the reaction temperature is maintained at 78° C. for two hours more. Then, in succession, 56.7 g of a trimerized hexamethylene diisocyanate (Basonat® PLR 8638, manufacturer: BASF AG) and 17.4 g of butanone oxime are added. After the reaction mixture has been maintained at 78° C. for a further hour, 10.6 g of diethanolamine are added for reaction of the remaining NCO groups and the reaction mixture is maintained at 78° C. until no further free NCO groups can be detected. In order to convert the polyurethane resin prepared in this way into a water-dilutable form, 56.6 g of butyldiglycol, 15.3 g of dimethylethanolamine and 743 g of distilled water are added in succession at 78° C. Subsequently the methyl ethyl ketone is distilled off in vacuo at from 50 to 60° C. from the resulting aqueous dispersion. The pH of the dispersion is then adjusted to from 7.0 to 7.4 with dimethylethanolamine and the solids content of the dispersion is adjusted to 41.7% by weight using distilled water.

1.2 Polyurethane resin II 383.6 g of a 73% strength solution of a polyester-polyol (acid number: from 3.5 to 4.0, prepared from 39.5 parts by weight of dimerized fatty acid (Pripol® 1013, manufacturer: Unichema) 21.7 parts by weight of 1,6-hexanediol and 11.7 parts by weight of isophthalic acid) in methyl ethyl ketone, 26.8 g of dimethylolpropionic acid, 157.2 g of dicyclohexylmethane diisocyanate (Desmodur® W, manufacturer: Bayer AG) and 95.3 g of methyl ethyl ketone are weighed under nitrogen into a dry reaction vessel having a thermometer and reflux condenser and are heated to 78° C. This temperature is maintained until an NCO content of from 2.5 to 2.6% is reached. Then 17.4 g of butanone oxime are added dropwise and the reaction temperature is maintained at 78° C. for two hours more. 7.1 g of diethanolamine are added for reaction of the remaining NCO groups and the reaction mixture is maintained at 78° C. until no further free NCO groups can be detected. In order to convert the polyurethane resin prepared in this way into a water-dilutable form, 48.9 g of butyldiglycol, 12.0 g of dimethylethanolamine and 770 g of distilled water are added in succession at 78° C. Subsequently the methyl ethyl ketone is distilled off in vacuo at from 50 to 60° C. from the resulting aqueous dispersion. The pH of the dispersion is then adjusted to from 7.0 to 7.4 with dimethylethanolamine and the solids content of the dispersion is adjusted to 37.7% by weight using distilled water.

2. Preparation of a Water-Dilutable Polyester Resin 199.2 g of isododecenylsuccinic anhydride, 471.7 g of neopentylglycol, 114.0 g of tetrahydrophthalic anhydride, 130.0 g of isophthalic acid and 23.0 g of toluene are weighed under nitrogen into a reactor equipped with a packed column, a column head attachment and a column head thermometer and are heated slowly with stirring to not more than 220°. In this procedure the column head temperature should not exceed 105° C. The condensation reaction is carried out up to an acid number of from 10 to 14 and subsequently the entraining agent is removed by distillation. Then at 160° C. 215.7 g of trimellitic anhydride are added and condensation is carried out at 170° C. up to an acid number of 52. The mixture is subsequently cooled to 120° C., and 126.6 g of butylglycol and 68.0 g of dimethylethanolamine are added. After it has cooled to a temperature below 100° C. the mixture is diluted with 1549 g of distilled water and is adjusted with dimethylethanolamine and further distilled water to a pH of 7.2 and a solids content of 41.0% by weight.

3. Production of Aqueous Coating Materials According to the Invention

In accordance with the parts by weight indicated in Table 1, the aqueous polyester dispersion described above has added to it deionized water, a solution of a commercially available antifoam based on an unsaturated branched diol dissolved in butyldiglycol and N,N-dimethylethanolamine and is made into a paste with aftertreated titanium dioxide of the rutile type and commercially available, finely divided barium sulfate, surface-treated talc and a commercially available lamp black. These mixtures are placed in a discontinuous laboratory sandmill and dispersed until a fineness of max. 12 μm in the Hegmann grindometer is reached.

The dispersion mixtures are then used, with the addition of the above-described polyurethane resin dispersions, low molecular weight melamine resin highly etherified with methanol (Cymel® 301, American Cyanamid Company), a commercially available leveling agent based on a water-dilutable acrylate resin, and butyldiglycol, to prepare aqueous coating materials which are adjusted using N,N-dimethylethanolamine to a pH of from 7.2 to 7.5 and with deionized water to a spray viscosity of 33 sec (DIN 4).

TABLE 1

|  | Aqueous coating material I | Aqueous coating material II |
| --- | --- | --- |
| Polyester dispersion | 21.8 | 21.8 |
| Deionized water | 11.3 | 11.3 |
| Antifoam | 0.9 | 0.9 |
| N,N-Dimethylethanolamine | 0.1 | 0.1 |
| Titanium dioxide | 12.2 | 12.2 |
| Barium sulfate | 12.2 | 12.2 |
| Talc | 2.8 | 2.8 |

TABLE 1-continued

|  | Aqueous coating material I | Aqueous coating material II |
| --- | --- | --- |
| Lamp black | 0.1 | 0.1 |
| Dispersion mixture | 61.4 | 61.4 |
| Polyurethane resin dispersion according to 1.1. | 30.0 | — |
| Polyurethane resin dispersion according to 1.2. | — | 33.0 |
| Melamine resin | 3.1 | 3.1 |
| Leveling agent | 0.6 | 0.6 |
| Butyldiglycol | 0.9 | 0.9 |
| Deionized water | 4.0 | 1.0 |
|  | 100.0 | 100.0 |

4. Application of the Aqueous Coating Materials According to the Invention and Testing of the Coating Films Obtained The coating materials according to the invention are sprayed onto phosphatized steel panels coated with a commercially available electrodeposition coating, using a flow cup pistol (nozzle aperture 1.2 mm; air pressure 4.5 bar) in two cross-passes with an intermediate flash-off time of one minute. The application was carried out at an air temperature of 23° C. and a relative atmospheric humidity of 60%. The sprayed panels were flashed off for 10 min at 23° C. and then for 10 min at 80° C. in a circulating-air oven and were then baked at 160° C. for 20 min in a circulating-air oven, cooled and assessed. The finishes obtained showed a very good leveling, covered the structure of the electrodeposition coat very well and exhibited good intercoat adhesion to the electrodeposition primer.

In order to test the adhesion of reactive window adhesives to the coats produced using the aqueous coating materials according to the invention, part of the surface of the coated steel panels is masked off directly after cooling with Tesaband 4657 from Beiersdorf AG. The steel panels treated in this way are stored at room temperature for 72 hours and then coated three times with a commercially available topcoat, each of the topcoats applied of course also being baked. After a waiting time of 72 hours the adhesive tape is peeled off at an acute angle, with no residues being observed on the area of adhesion. A moisture-reactive adhesive compound (Betaseal® L 1751, one-component window-bonding and sealing composition based on polyurethane, from Gurit Essex) is applied to the filler coat exposed in this way in the shape of a slug with a diameter of 10 mm and a length of at least 200 mm and pressed onto the coated surface using a spatula in such a way that the slug still has a height of about 5 mm. The panels treated in this way are stored under standard climatic conditions (DIN 50014, 23/50-2) for 7 days. They are subsequently packed in wadding moistened with deionized water, covered with an aluminum foil and sealed in a polyethylene film. The panels packaged in this way are stored at 70° C. for 7 days and then at −25° C. for 16 hours. Afterwards the panels, as soon as they have regained room temperature, are unpacked and stored at room temperature for 24 hours. Finally, the adhesion of the slug of adhesive is tested by cutting open the slug down to the area of adhesion while at the same time peeling off the slug of adhesive. In this test an excellent adhesion of the slug of adhesive is observed to the finishes produced using the coating materials according to the invention.

5. Comparative Test

An aqueous coating material is prepared in accordance with the disclosure of DE-A-40 05 961 by employing, in the preparation procedure described under 3., not an aqueous dispersion of a polyurethane resin prepared in accordance with the invention but instead 34.0 parts by weight of an aqueous polyurethane resin dispersion prepared by the preparation procedure described below. The aqueous comparison coating material produced in this way is used to prepare coating films as described under 4. which are subjected to the tests described under 4. In these tests it is noted that the adhesion of the slug of adhesive to the finish produced using the comparison coating material is substantially poorer than to the finishes produced using the aqueous coating materials according to the invention.

5.1 Preparation of the aqueous polyurethane resin dispersion employed in the comparison coating material 480.3 g of a 73% strength solution of a polyester-polyol (acid number: 3.5 to 4.0, prepared from 39.5 parts by weight of dimerized fatty acid (Pripol® 1013, manufacturer: Unichema) 21.7 parts by weight of 1,6-hexanediol and 11.7 parts by weight of isophthalic acid) in methyl ethyl ketone, 31.4 g of dimethylolpropionic acid, 169.1 g of dicyclohexylmethane diisocyanate (Desmodur® W, manufacturer: Bayer AG), 6.5 g of neopentylglycol and 56.2 g of methyl ethyl ketone are weighed under nitrogen into a dry reaction vessel having a thermometer and reflux condenser and are heated to 85° C. This temperature is maintained until an NCO content of 1.11% is reached. After the mixture has cooled to 78° C., 17.8 g of trimethylolpropane and 91.3 g of methyl ethyl ketone are added. As soon as a sample of the reaction mixture diluted with N-methylpyrrolidone in a weight ratio of 1:1 shows a viscosity of between 12 and 15 dPas, 57.6 g of butyldiglycol are added to the reaction mixture and the reaction mixture is maintained at 78° C. for a further hour. In order to convert the polyurethane resin prepared in this way into a water-dilutable form, 11.7 g of dimethylethanolamine and 1020 g of distilled water are added. The methyl ethyl ketone is subsequently distilled off at from ⁻50 to 60° C. in vacuo from the aqueous dispersion obtained in this way. The pH of the dispersion is then adjusted to 7.2 with dimethylethanolamine and the solids content of the dispersion is adjusted to 36.7% by weight with distilled water.

We claim:

1. Aqueous coating composition containing at least one water-dilutable polyurethane resin as binder, wherein the water-dilutable polyurethane resin is prepared by reacting, in a first step,
    (a) a polyisocyanate or a mixture of polyisocyanates and
    (b) a compound whose molecule contains at least one group which is reactive toward isocyanate groups and at least one acidic group which is capable of forming anions, or a mixture of such compounds, and
    (c) optionally, a polyester- and/or polyether-polyol having a number-average molecular weight of from 400 to 5000, or a mixture of such polyester- and/or polyether-polyols, and
    (d) optionally, a polyol having a number-average molecular weight of from 60 to 399, or a mixture of such polyols, to give an isocyanato-containing prepolymer (I), components (a), (b), (c) and (d) being reacted with one another in a proportion such that the isocyanate groups and the groups which are reactive toward isocyanate groups are present in a ratio of equivalents of from 1.04:1.00 to 10.00:1.00 and the resultant polyurethane has an acid number between 18 and 70; in a second stage reacting some of the free isocyanate groups present in the prepolymer (I) with
    (e) a blocking agent or a mixture of blocking agents so as to form a prepolymer (II) containing blocked isocyanate groups, component (e) being employed in a quantity such that the prepolymer (II) still contains on average at least one free isocyanate group per molecule; and the prepolymer (II) is reacted with
    (g) a compound containing at least one primary or secondary amino group and at least one hydroxyl group in the molecule, or a mixture of such compounds, to give a polyurethane resin, component (g) being employed in a quantity such that the free isocyanate groups of the prepolymer (II), the amino groups of component (g) and the hydroxyl groups of component (g) are in a ratio of equivalents of from 1.00:0.15 to 5.00:0.15 to 5.00; and finally, at least partially neutralizing acidic groups capable of forming anions on the polyurethane resin, to form a water-dilutable polyurethane resin.

2. Aqueous coating composition according to claim 1, wherein components (a), (b), (c) and (d) are reacted with one another in a ratio such that the isocyanate groups and the groups reactive toward isocyanate groups are present in a ratio of equivalents of from 1.15:1.00 to 6.00:1.00 and the resultant polyurethane resin has an acid number of from 18 to 35.

3. Aqueous coating composition according to claim 1, wherein the free isocyanate groups of the prepolymer (II) the amino groups of component (g) and the hydroxyl groups of component (g) are in a ratio of equivalents of from 1.00:0.25 to 3.00:0.25 to 3.00.

4. Aqueous coating composition according to claim 1, wherein the free isocyanate groups of the prepolymer (II), the amino groups of component (g) and the hydroxyl groups of component (g) are in a ratio of equivalents from 1.00:0.33 to 2.00:0.33 to 2.00.

5. A process for the finishing of car bodies, comprising applying to a substrate an electrodeposition coating composition; applying as a filler coat a coating composition according to claim 1 over the electrodeposition coating; applying one or two topcoats over the filler coat; and baking the coating to form a cured film on the substrate.

6. A filler coating composition comprising the aqueous coating composition according to claim 1.

7. Aqueous coating composition of claim 1, wherein the polyurethane has an acid number of from 18 to 35.

8. Aqueous coating composition of claim 1, further comprising the step of mixing the prepolymer (II), prior to reaction with component g), with
    (f) 2.0–400% by weight, based on the quantity of prepolymer (II), of a partially blocked polyisocyanate prepared from a polyisocyanate which contains on average more than 2.0 isocyanate groups per molecule and is free from acidic groups capable of forming anions, or from a mixture of such polyisocyanates and component (e), component (e) being employed in a quantity such that the prepolymer (II) still contains on average at least one free isocyanate group per molecule; to provide a polyurethane resin, and neutralizing the acidic groups of the polyurethane resin to provide a water dilutable polyurethane resin.

9. Aqueous coating composition according to claim 8, wherein the free isocyanate groups of the mixture of prepolymer (II) and component (f), the amino groups of component (g) and the hydroxyl groups of component (g) are in a ratio of equivalents of from 1.00:0.25 to 3.00:0.25 to 3.00.

10. Aqueous coating composition according to claim 8, wherein the free isocyanate groups of the mixture of prepolymer (II) and component (f), the amino groups of component (g) and the hydroxyl groups of component (g) are in a ratio of equivalents from 1.00:0.33 to 2.00:0.33 to 2.00.

11. Aqueous coating composition of claim 8, wherein the polyurethane has an acid number of from 18 to 35.

12. A process for the finishing of car bodies, comprising applying to a substrate an electrodeposition coating composition; applying as a filler coat a coating composition according to claim 8 over the electrodeposition coating; applying one or two topcoats over the filler coat; and baking the coating to form a cured film on the substrate.

13. Aqueous coating composition of claim 8, wherein the coating is a filler coating composition.

14. An aqueous coating composition according to claim 8, wherein the free isocyanate groups of the prepolymer (II) and component (f), the amino groups of component (g), and the hydroxyl groups of component (g) are in a ratio of equivalents of from 1.00:0.25 to 3.00:0.25 to 3.00.

15. An aqueous coating composition according to claim 8, wherein the free isocyanate groups of the prepolymer (II) and component (f), the amino groups of component (g), and the hydroxyl groups of component (g) are in a ratio of equivalents of from 1.00:0.33 to 2.00:0.33 to 2.00.

* * * * *